(12) United States Patent
Ananthapur Bache et al.

(10) Patent No.: US 11,093,129 B2
(45) Date of Patent: Aug. 17, 2021

(54) METHODS FOR REPOSITIONING ICONS ON TOUCH DISPLAYS BASED ON CHARACTERISTICS OF TOUCH GESTURES AND RELATED PROGRAM PRODUCTS

(71) Applicant: International Business Machines Corporation, Armonk, NY (US)

(72) Inventors: Vijay Kumar Ananthapur Bache, Bangalore (IN); Vijay Ekambaram, Chennai (IN); Sarbajit Kumar Rakshit, Kolkata (IN); Saravanan Sadacharam, Chennai (IN)

(73) Assignee: International Business Machines Corporation, Armonk, NY (US)

( * ) Notice: Subject to any disclaimer, the term of this patent is extended or adjusted under 35 U.S.C. 154(b) by 398 days.

(21) Appl. No.: 15/416,374

(22) Filed: Jan. 26, 2017

(65) Prior Publication Data

US 2018/0210640 A1    Jul. 26, 2018

(51) Int. Cl.
| | | |
|---|---|---|
| *G06F 3/0488* | (2013.01) |
| *G06F 3/0481* | (2013.01) |
| *G06F 3/0484* | (2013.01) |
| *G06F 3/01* | (2006.01) |

(52) U.S. Cl.
CPC ...... *G06F 3/04883* (2013.01); *G06F 3/04817* (2013.01); *G06F 3/04847* (2013.01); *G06F 3/017* (2013.01); *G06F 2203/04808* (2013.01)

(58) Field of Classification Search
None
See application file for complete search history.

(56) References Cited

U.S. PATENT DOCUMENTS

| | | | |
|---|---|---|---|
| 5,568,604 A | 10/1996 | Hansen | |
| 6,278,443 B1 * | 8/2001 | Amro | G06F 3/038 |
| | | | 178/18.01 |

(Continued)

FOREIGN PATENT DOCUMENTS

| | | |
|---|---|---|
| CN | 203761432 U | 8/2014 |
| CN | 105446641 A | 3/2016 |

OTHER PUBLICATIONS

Bing search q=shift+icon+state+change&src=IE-Se Mar. 4, 2020 (Year: 2020).*

(Continued)

*Primary Examiner* — Cesar B Paula
*Assistant Examiner* — John M Heffington
(74) *Attorney, Agent, or Firm* — Kelli D. Morin

(57) ABSTRACT

Methods and program products repositioning icons on a touch display based on characteristics of touch gestures performed on the touch display. The disclosed method may include detecting characteristics of a touch gesture performed on a touch display of an electronic device, and determining if the detected characteristics of the touch gesture exceed a predetermined threshold. In response to determining the detected characteristics exceed the predetermined threshold, the method may also include selecting a group of icons based on at least one of the detected characteristics of the touch gesture performed on the touch display, or predetermined electronic device data. Additionally, the method may include repositioning the selected group of icons on the touch display.

20 Claims, 12 Drawing Sheets

(56) References Cited

U.S. PATENT DOCUMENTS

| | | | |
|---|---|---|---|
| 8,448,083 B1* | 5/2013 | Migos | G06F 3/04883 345/671 |
| 2007/0192749 A1* | 8/2007 | Baudisch | G06F 3/0486 715/863 |
| 2007/0234226 A1* | 10/2007 | Szeto | G06F 3/04842 715/769 |
| 2008/0077874 A1* | 3/2008 | Garbow | G06F 3/0486 715/764 |
| 2011/0130182 A1* | 6/2011 | Namba | A63F 13/812 463/3 |
| 2012/0047460 A1* | 2/2012 | McCann | G06F 9/451 715/809 |
| 2012/0084739 A1* | 4/2012 | Sirpal | G06F 1/16 715/863 |
| 2013/0254700 A1* | 9/2013 | Hamilton, II | G06F 3/0483 715/776 |
| 2014/0096092 A1* | 4/2014 | Johnson | G06F 3/0481 715/863 |
| 2014/0289642 A1 | 9/2014 | Prasad | |
| 2015/0007069 A1 | 1/2015 | Huang | |
| 2015/0033123 A1* | 1/2015 | Arrasvuori | G06F 3/165 715/716 |
| 2015/0309713 A1* | 10/2015 | Dong | G07F 17/329 715/766 |
| 2016/0274748 A1* | 9/2016 | Feng | H04M 1/72519 |

OTHER PUBLICATIONS

Unknown; "Android—Detect Touch Pressure on capacitive touch screen?"; Stack Overflow; pp. 1; Printed Nov. 29, 2016; <http://stackoverlow.com/questions/17540056/android-detech-touch-pressure-on-capacitive-touch-screen>.

Bogawat, Ashish; "Complete Guide to Customizing Your Home Screen Icons"; Android.AppStorm; Sep. 27, 2011; Printed Nov. 29, 2016; pp. 10; <http://android.appstorm.net/how-to/customization/complete-guide-to-customizing-your-home-screen-icons/>.

Unknown; "Mobile Mouse: Turn your iPhone, iPad, or Apple Watch into a Remote for your computer"; Mobile Mouse; Printed Nov. 29, 2016; pp. 20; <http://www.mobilemouse.com/support.html>.

Unknown; "Touch gestures"; HTC One; Printed Nov. 29, 2016; pp. 5; <http://www.htc.com/us/support/htc-one/howto/cat_54453.html>.

Graham-Rowe, Duncan; "A quantum switch could add pressure sensing to mobile screens"; Mobile Touch Screens Could Soon Feel the Pressure; Jan. 27, 2010; pp. 7; Printed Nov. 29, 2016; <https://www.technologyreview.com/s/417246/mobile-touch-screens-could-soon-feel-the-pressure>.

* cited by examiner

METHODS FOR REPOSITIONING ICONS ON TOUCH DISPLAYS BASED ON CHARACTERISTICS OF TOUCH GESTURES AND RELATED PROGRAM PRODUCTS

TECHNICAL FIELD

The disclosure relates generally to electronic devices, and more particularly to methods and program products for repositioning icons on a touch display based on characteristics of touch gestures performed on the touch display.

BACKGROUND

Screen sizes for conventional electronic devices continue to increase in size each year. Specifically, electronic devices that include interactive touch displays or screens are currently being designed to include larger and larger screens. The size of the screens for conventional electronic devices are made larger to improve visibility for the various uses of the electronic device (e.g., multimedia, word processing, internet processing and so on). Additionally, designing electronic devices to include larger screen sizes also increases the amount of interactive space for a user of the electronic device. These benefits are just some examples that improve user experience with the electronic devices that include larger screens.

However, by increasing the size of the screens on conventional electronic devices, users may experience difficulties with controlling and/or interacting with electronic devices. Specifically, the majority of users of handheld or portable electronic devices prefer to control their device with one hand. As the size of the screen increases, the user may have a difficult time reaching all portions of the screen to interact with the various icons and/or applications associated with the icons of the electronic device. To compensate, a user may be required to adjust their hand position and/or grip each time they wish to interact with portions of screen that are located furthest from the user's fingers. Additionally, because the size of the screen increases, the overall size of the electronic device also increases, which makes gripping, holding and/or adjusting a hand position on the electronic device cumbersome. Furthermore, because of the increase in the overall size of the electronic device, each time the user adjusts their hand to reach a certain portion of the screen, a risk of dropping and causing damage to the electronic device increases.

SUMMARY

Aspects of the disclosure provide methods and program products for repositioning icons on a touch display based on characteristics of touch gestures performed on the touch display.

A first aspect discloses a method including: detecting characteristics of a touch gesture performed on a touch display of an electronic device; determining if the detected characteristics of the touch gesture exceed a predetermined threshold; in response to determining the detected characteristics exceed the predetermined threshold, selecting a group of icons based on at least one of: the detected characteristics of the touch gesture performed on the touch display, or predetermined electronic device data; and repositioning the selected group of icons on the touch display.

A second aspect discloses a computer program product stored on a computer readable storage medium, which when executed by a computing system, processes characteristics of a touch gesture performed on a touch display of an electronic device, the program product including: program code that determines if the characteristics of the touch gesture exceed a predetermined threshold; program code that selects a group of icons based on at least one of the characteristics of the touch gesture performed on the touch display or predetermined electronic device data, in response to determining the characteristics of the touch gesture exceed the predetermined threshold; and program code that repositions the selected group of icons on the touch display.

A third aspect discloses a computerized method that processes characteristics of a touch gesture performed on a touch display of an electronic device, the method including: detecting characteristics of a touch gesture performed on a touch display of an electronic device; determining if the detected characteristics of the touch gesture exceed a predetermined threshold; in response to determining the detected characteristics exceed the predetermined threshold, selecting a group of icons based on at least one of: the detected characteristics of the touch gesture performed on the touch display, or predetermined electronic device data; and repositioning the selected group of icons on the touch display.

The illustrative aspects of the present disclosure solve the problems herein described and/or other problems not discussed.

BRIEF DESCRIPTION OF THE DRAWINGS

These and other features of this invention will be more readily understood from the following detailed description of the various aspects of the invention taken in conjunction with the accompanying drawings in which.

Figure 1:
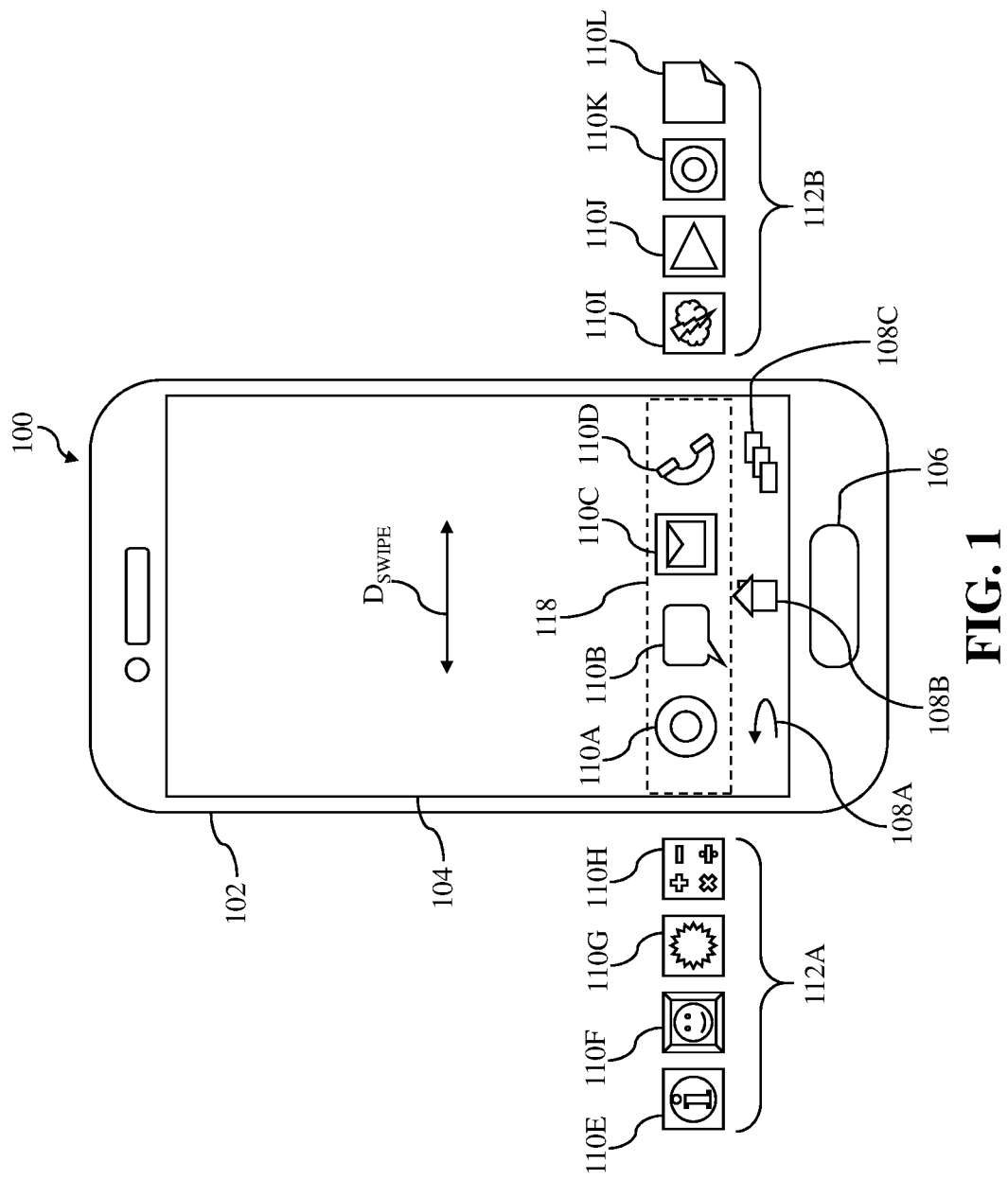
FIG. 1 depicts an illustrative front view of an electronic device including a plurality of icons, according to embodiments.

The drawings are not necessarily to scale. The drawings are merely schematic representations, not intended to portray specific parameters of the invention. The drawings are intended to depict only typical embodiments of the invention, and therefore should not be considered as limiting the scope of the invention. In the drawings, like numbering represents like elements.

DETAILED DESCRIPTION

Reference will now be made in detail to representative embodiments illustrated in the accompanying drawings. It should be understood that the following descriptions are not intended to limit the embodiments to one preferred embodiment. To the contrary, it is intended to cover alternatives, modifications, and equivalents as can be included within the spirit and scope of the described embodiments as defined by the appended claims.

The following disclosure relates generally to electronic devices, and more particularly to methods and program products for repositioning icons on a touch display based on characteristics of touch gestures performed on the touch display.

These and other embodiments are discussed below with reference to FIGS. 1-12. However, those skilled in the art will readily appreciate that the detailed description given herein with respect to these Figures is for explanatory purposes only and should not be construed as limiting.

FIG. 1 shows an illustrative front view of an electronic device 100, according to embodiments. As discussed in detail herein, electronic device 100, and its processing device and/or components included therein, may be configured to reposition icons on a touch display of electronic device 100 based on characteristics of touch gestures performed on the touch display. The repositioning of the icons on the touch display of electronic device 100 may improve user-interaction with electronic device 100 and/or may allow a user to interact with the icons on the touch display without moving and/or adjusting their hand(s) position on electronic device 100.

In the illustrated non-limiting example, electronic device 100 is implemented as a smart telephone. In other non-limiting examples, electronic device 100 can be implemented as any suitable device including, but not limited to, a laptop or desktop computer, a tablet computing device, a gaming device, a display, a digital music player, a wearable computing device or display such as a watch, and other suitable type of electronic device that include a touch display and icons associated with interactive applications, commonly known as "Apps," and/or documents (e.g., word-processing documents) of electronic device 100.

Electronic device 100 includes a casing 102 at least partially surrounding a touch display 104 and one or more buttons 106. Casing 102 can form an outer surface or partial outer surface and protective case for the internal components of electronic device 100 (see, FIG. 12), and may at least partially surround touch display 104. Casing 102 can be formed of one or more components operably connected together, such as a front piece and a back piece. Alternatively, casing 102 can be formed of a single piece operably connected to the touch display 104.

Touch display 104 can be implemented with any suitable technology, including, but not limited to, a multi-touch sensing touchscreen that uses liquid crystal display (LCD) technology, light emitting diode (LED) technology, organic light-emitting display (OLED) technology, organic electroluminescence (OEL) technology, or another type of display technology. As discussed herein, button 106 may be utilized by electronic device 100 to provide user input and/or allow the user to interact with the various functions of electronic device 100.

Although not shown, electronic device 100 may also include at least one sensor positioned below, in contact with and/or in electrical communication with touch display 104. In a non-limiting example, the at least one sensor may be configured as a capacitive touch sensor that may capacitively sense a user's touch or gesture, input force or deformation of the touch display 104 due to application of a user's gesture or input force on touch display 104 of electronic device 100. The at least one capacitive touch sensor may measure changes in capacitances, the touch, force, and/or contact applied to touch display 104 by a user or object. The touch gestures and input force applied to touch display 104 by a user of electronic device 100 may be detected, sensed, identified and/or determined by the at least one sensor positioned below, in contact with and/or in electrical communication with touch display 104. That is, and as discussed in detail herein, the at least one sensor may detect the touch gesture performed on touch display 104, and may also detect characteristics (e.g., move characteristics, force characteristics) of the touch gesture to determine if icons of electronic device 100 may be repositioned on touch display 104. Although discussed herein as a capacitive touch sensor, it is understood that electronic device 100 may utilize any suitable sensor(s) (e.g., pressure sensor) that may be configured to detect and/or determine the characteristics of a touch gesture performed on touch display 104, as discussed in detail below.

Electronic device 100 may also include a plurality of icons 108, 110. Specifically, touch display 104 may provide, display, and/or visually depict a plurality of icons 108, 110, where each icon of the plurality of icons 108, 110 may be associated with a system or "generic" function of electronic device 100 or an application or "App" included within electronic device 100. In a non-limiting example shown in FIG. 1, the plurality of system icons 108A-108C may be associated with a system or "generic" function for electronic device 100 that when interacted with, may provide an action on electronic device 100 that is independent of the application being utilized by electronic device 100. For example, first system icon 108A may be engaged, activated and/or interacted with by a user (e.g., taps or clicks) to display the previous application being interacted with by the user on touch display 104 (e.g., "back button"). In another non-limiting example, system icon 108B may be engaged, activated and/or interacted with by a user to display the "Home Screen" of electronic device 100 on touch display 104 (see, FIG. 1). In a further non-limiting example, system icon 108C may be engaged, activated and/or interacted with by a user to display all applications currently open on touch display 104 of electronic device 100 to allow a user to more easily switch between applications. As discussed herein, the plurality of system icons 108A-108C may remain visible on touch display 104 during operation of electronic device 100, and specifically, when repositioning the plurality of system icons 108 and/or the plurality of application icons 110 on touch display 104 of electronic device 100.

The plurality of application icons 110 may be associated with interactive applications of electronic device 100. The applications associated with the plurality of application icons 110 may be stored within any suitable memory or storage device (internal, external, cloud-based and so on) on and/or associated with electronic device 100 and may be configured to be interacted with by a user of electronic device 100 for providing communication capabilities and/or information to the user. Additionally as discussed herein, the applications may be interacted with, opened and/or accessed when a user of electronic device 100 engages, activates and/or interacts (e.g., taps or clicks) with the application icon 110 associated with a specific application. In non-limiting examples, the applications associated with the plurality of application icons 110 may include messaging applications (e.g., Short Message Service (SMS), Multimedia Messaging Services (MMS), electronic mail (e-mail) and so on), communication applications (e.g., telephone, video-conferencing, and so on), multimedia applications (e.g., cameras, picture libraries, music libraries, video libraries, games and so on), information applications (e.g., global positioning systems (GPS), weather, internet, news and so on), and any other suitable applications that may be included within electronic device 100.

As shown in FIG. 1, electronic device 100 may include a plurality of application icons 110A-110L. However, the number of application icons 110 visible on touch display 104 may be limited and/or may only be a portion of the total number of application icons 110 included on electronic device 100. In a non-limiting example shown in FIG. 1, four application icons 110A-110D may be visible on touch display 104 at a given time. Non-visible groups 112A, 112B of the plurality of application icons 110E-110L may be included within electronic device 100, but may not initially be displayed, visible and/or visually depicted on touch display 104. In a non-limiting example, the plurality of application icons 110A-110L may be scrolled through, and/or made visible on touch display 104 when a user swipes and/or slides their finger in a direction ($D_{SWIPE}$) (e.g., swipe gesture) within a swipe area 118 of touch display 104. Specifically, a first non-visible group 112A of the plurality of application icons 110E-110H may be accessed, moved and/or become visible on touch display 104 when a user swipes their finger in swipe area 118 in a direction ($D_{SWIPE}$) toward a second non-visible group 112B of the plurality of application icons 110I-110L. Additionally, the second non-visible group 112B of the plurality of application icons 110I-110L may be accessed, moved and/or become visible on touch display 104 when a user swipes their finger in swipe area 118 in a direction ($D_{SWIPE}$) toward first non-visible group 112A of the plurality of application icons 110E-110H. In another non-limiting example, a user may swipe their finger in a single direction ($D_{SWIPE}$) within swipe area 118 to continuously scroll through the plurality of application icons 110A-110L. In any example, once non-visible application icons become visible, previously visible application icons (e.g., application icons 110A-110D) may become invisible. Although discussed herein as being moved in groups (e.g., non-visible groups 112A, 112B), it is understood that individual application icons 110A-110L may be moved on or off of touch display 104 to become visible and/or non-visible.

The number of application icons 110 visible on touch display 104 may be limited by a variety of parameters including, but not limited to, a size or dimension of touch display 104, a size or dimension of the plurality of application icons 110, operational system preferences for electronic device 100, a user-specified preference for electronic device 100 and any other suitable parameter that may limit the number of application icons 110 visible on touch display 104. Additionally, it is understood that the number of icons 108, 110 included within electronic device 100 and/or visible on touch display 104 of electronic device 100 is merely illustrative. As such, electronic device 100 may include more or less icons 108, 110 and/or touch display 104 may provide, display, and/or visually depict more or less icons 108, 110 than the number of icons 108, 110 depicted in FIG. 1. Additionally, although only a single row of each icon 108, 110 is depicted, it is understood that touch display 104 may provide, display, and/or visually depict more rows of icons 108, 110 than the number of rows of icons 108, 110 depicted in FIG. 1.

FIGS. 2-12 depict various non-limiting examples of electronic device 100 repositioning icons 108, 110 on touch display 104 based on characteristics of touch gestures performed on touch display 104. It is understood that similarly numbered and/or named components may function in a substantially similar fashion. Redundant explanation of these components has been omitted for clarity.

Figure 2:
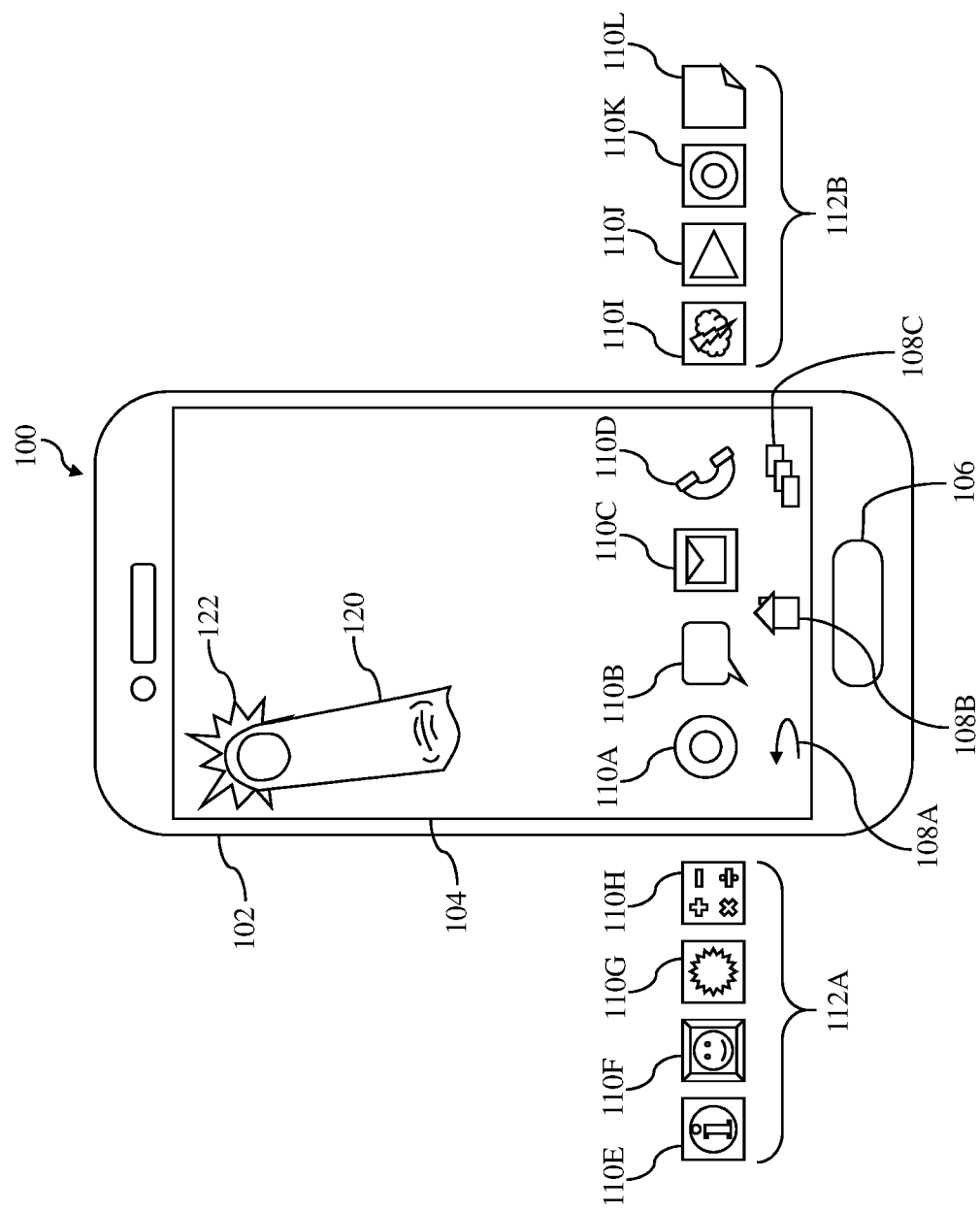
FIG. 2 depicts an illustrative front view of the electronic device including the plurality of icons of FIG. 1, and a user interacting with the electronic device, according to embodiments.

Turning to FIG. 2, a user 120, and specifically a user's finger, is shown to be interacting with electronic device 100. Specifically, user 120 is interacting with electronic device 100 by making an initial touch or contact 122 with touch display 104. Initial touch 122 performed on touch display 104 by user 120 may include and/or may be the beginning of a variety of different detectable touch gestures (see, FIG. 3) and/or interactions performed by user 120. In non-limiting examples, and as discussed in detail herein, touch gesture 124 may include a single or series of taps on touch display 104 in substantially the same place, a swipe across touch display 104, a press-and-hold gesture, a press-and-swipe or drag across touch display 104, a predetermined touch sequence and so on.

Initial touch 122 performed on touch display 104 may be sensed and/or may have associated characteristics detected by the sensor(s) (see, FIG. 12) of electronic device 100 positioned below and/or in electronic communication with touch display 104. In the non-limiting example discussed herein with respect to FIG. 1, the sensor(s) of electronic device 100 may include a capacitive touch sensor(s). When user 120 makes initial touch 122 on touch display 104, the capacitive touch sensor(s) of electronic device may detect and/or sense various characteristics of initial touch 122. For example, capacitive touch sensor(s) of electronic device 100 may be configured to detect and/or sense a change in capacitance on touch display 104 when initial touch 122 is performed. The amount of change in capacitance on touch display 104 detected, identified and/or sensed by the sensor(s) may indicate whether user 120 has touched or pressed touch display 104 during initial touch 122, or instead is just "hoovering" over touch display 104. Additionally, sensor(s) of electronic device 100 may also detect and/or sense a force or force input applied to touch display 104 of electronic device 100 when user 120 performs initial touch 122. Additionally, and as discussed herein, sensor(s) of electronic device 100 may also detect and/or sense various characteristics for any subsequent touch or gestures that begin with initial touch 122, as discussed herein.

Figure 3:
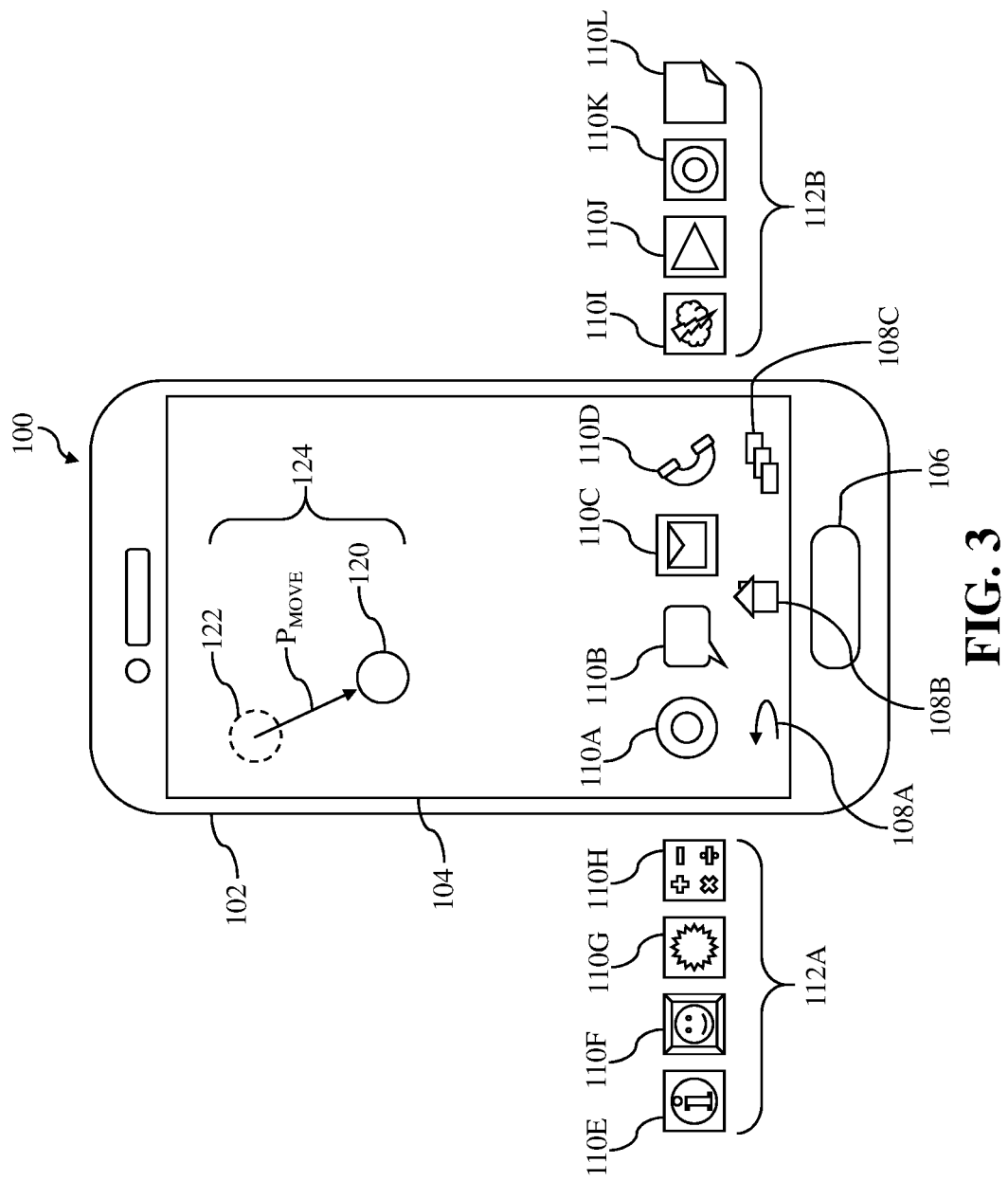
FIG. 3 depicts an illustrative front view of the electronic device and the user interacting with the electronic device of FIG. 2, according to embodiments.

Turning to FIG. 3, a touch gesture 124 performed by user 120 is shown. User 120, and specifically the finger of user 120 shown in FIG. 2, has been illustratively simplified to a single circle for clarity purposes. It is understood that the circle representing user 120 may depict the portion of user's finger that remains in contact with touch display 104. As shown in the non-limiting example, touch gesture 124 may include user 120 moving their finger from initial touch 122 (shown in phantom) along touch display 104. Specifically, touch gesture 124 may include user 120 moving their finger along a path ($P_{MOVE}$), originating at initial touch 122, over touch display 104. User 120 may maintain contact with and/or may substantially maintain an applied force on touch display 104 when performing touch gesture 124. In a non-limiting example shown in FIG. 3, user 120 may stop moving their finger in a direction of the movement path ($P_{MOVE}$) in the position depicted when performing touch gesture 124. In another non-limiting example, and as discussed herein, it may be understood that FIG. 3 depicts user's 120 finger at an intermittent point of movement as user 120 moves their finger along the movement path ($P_{MOVE}$) toward the plurality of application icons 110, when performing touch gesture 124. Touch gesture 124 performed by user 120 on touch display 104 may begin and/or trigger electronic device 100 to perform the processes, operations and/or methods for repositioning icons 108, 110 on touch display 104 based on characteristics of touch gestures 124 performed on touch display 104, as discussed herein.

Similarly discussed above with respect to initial touch 122 shown in FIG. 2, electronic device 100, and more specifically sensor(s) in communication with touch display 104, may be configured to detect and/or sense characteristics of touch gesture 124 performed by user 120. More specifically, electronic device 100 and/or sensor(s) may be configured to detect and/or sense movement characteristics of touch gesture 124 and/or force or force characteristics of touch gesture 124. As discussed herein, the characteristics (e.g., movement characteristics and/or force characteristics) of touch gesture 124 may be determine if a selected group of the plurality of icons 108, 110 will be repositioned on touch display 104 of electronic device 100. Movement characteristics of touch gesture 124 may include, but are not limited to, a direction of movement (e.g., $P_{MOVE}$) for touch gesture 124, a length of touch gesture 124 performed on touch display 104, a duration of contact with touch display 104 for touch gesture 124, a discontinuity in contact with touch display 104 and/or a predetermined touch sequence (see, FIG. 10) performed on touch display 104. Additionally, force characteristics of touch gesture 124 may include, but are not limited to, a magnitude of force applied to touch display 104 when performing touch gesture 124, and/or a variation or change in force applied to touch display 104 during touch gesture 124.

Once the characteristics of touch gesture 124 performed by user 120 are detected, identified and/or sensed, electronic device 100 may analyze the characteristics of touch gesture 124 to determine if a selected group of the plurality of icons 108, 110 will be repositioned on touch display 104. Specifically, electronic device 100 may analyze, and/or compare the detected characteristics of touch gesture 124 with predetermined thresholds of electronic device 100 and/or touch display 104 to determine if the detected characteristics of touch gesture 124 exceed the predetermined thresholds. The predetermined thresholds of electronic device 100 and/or touch display 104 may include movement thresholds and/or force thresholds that substantially correspond and/or correlate to the detected, identified, and/or sensed movement characteristics and/or force characteristics of touch gesture 124. In non-limiting examples, the predetermined thresholds include, but are not limited to, a direction of touch threshold, a length of touch threshold, a duration of contact threshold, a discontinuity in contact threshold, and/or a magnitude of force threshold. Predetermined thresholds may be stored on electronic device 100 and/or external storage device in communication with electronic device 100, as discussed herein.

Where the predetermined threshold(s) is not exceeded by the characteristic(s) of touch gesture 124, electronic device 100 may not subsequently reposition icons 108, 110 on touch display 104. Specifically, electronic device 100 may not reposition icons 108, 110 on touch display when the direction of movement of touch gesture 124 is not within the threshold (e.g., path of movement ($P_{MOVE}$) is away from icons 108, 110), and/or a length of touch gesture 124 is less than the predetermined length threshold. Additionally, electronic device 100 may not reposition icons 108, 110 on touch display when a duration of contact with touch display 104 is less than the predetermined duration threshold (e.g., 0.5 second), and/or a discontinuity in contact with touch display 104 is above the predetermined discontinuity threshold a predetermined (e.g., touch gesture 124 includes various taps in random positions on touch display 104 and/or no continuous contact with touch display 104). Furthermore, electronic device 100 may not reposition icons 108, 110 on touch display when touch gesture 124 does not match a touch sequence (see, FIG. 10) performed on touch display 104 and/or a force magnitude of touch gesture 124 does not exceed the predetermined force threshold (e.g., force thresholds associated with touch gestures such as taps, clicks, scrolling, selecting and/or so on).

Conversely, electronic device 100 may reposition a select group of the plurality of icons 108, 110 when it is determined that the characteristic(s) of touch gesture 124 exceed the predetermined threshold(s) of electronic device 100. In a non-limiting example, all applicable characteristics of touch gesture 124 must exceed the predetermined threshold(s) of electronic device 100 in order for electronic device 100 to reposition icons 108, 110 on touch display 104. In another non-limiting example, only a single, applicable characteristic of touch gesture 124 must exceed the corresponding predetermined threshold of electronic device 100 for electronic device 100 to reposition icons 108, 110 on touch display 104. Furthermore, any number of characteristics and/or predetermined thresholds may be compared in order to determine if electronic device 100 will reposition icons 108, 110 on touch display 104.

Figure 4:
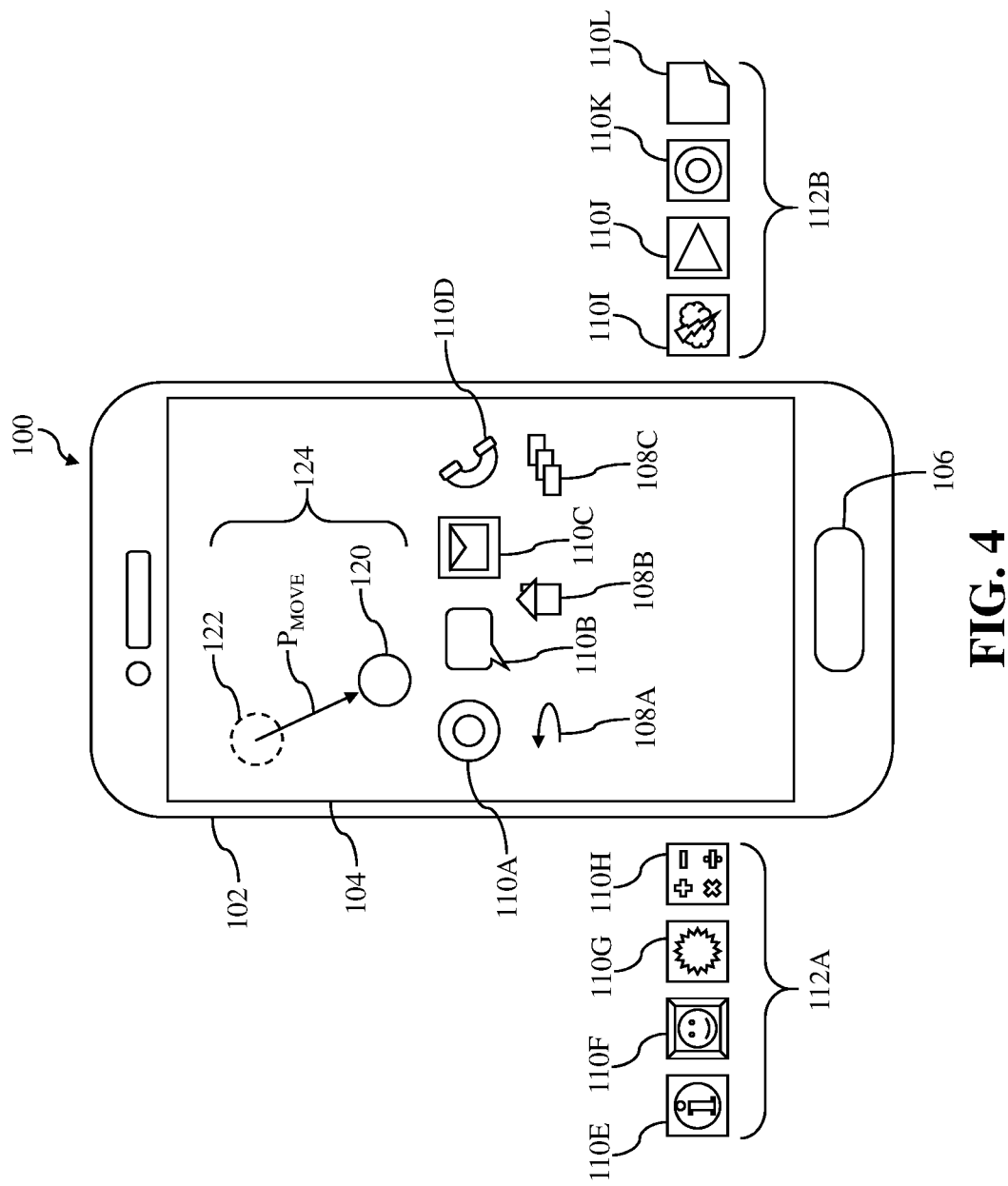
FIG. 4 depicts an illustrative front view of the electronic device and repositioning icons on the electronic device based on the user interacting with the electronic device of FIG. 2, according to embodiments.

Turning to FIG. 4, electronic device 100 shows a selected group of the plurality of icons 108, 110 being repositioned on touch display 104. In the non-limiting example shown in FIG. 4, the selected group (e.g., icons 108A-10C, 110A-110D) of the plurality of icons 108, 110 may be repositioned on touch display 104 after determining that the characteristic(s) of touch gesture 124 exceed the predetermined threshold(s) of electronic device 100. In response to determining the characteristic(s) of touch gesture 124 exceed the predetermined threshold(s) of electronic device 100, electronic device 100 may first identify and/or select a group of icons 108A-10C, 110A-110D of the plurality of icons 108, 110 to be repositioned, and may subsequently reposition the selected group of icons 108A-10C, 110A-110D on touch display 104. Identifying and/or selecting the group of icons 108A-10C, 110A-110D may be based on the detected, identified and/or sensed characteristics (e.g., movement characteristics and/or force characteristics) of touch gesture 124 and/or predetermine electronic device data.

In a non-limiting example shown in FIGS. 3 and 4, the path of movement ($P_{MOVE}$) for user 120 (e.g., movement characteristic) may be toward and/or aligned with the system icons 108A-108C and/or visible application icons 110A-110D shown or depicted on touch display 104. As a result, electronic device 100 may selected system icons 108A-108C and/or visible application icons 110A-110D from the plurality of icons 108, 110 based on the path of movement ($P_{MOVE}$) of touch gesture 124, and may reposition the selected group of icons 108A-10C, 110A-110D on touch display 104, toward and adjacent user 120. In another non-limiting example where electronic device 100 selects the group of icons 108A-10C, 110A-110D based on characteristics of touch gesture 124, the force magnitude applied to touch display by user 120 (e.g., force characteristic) may exceed a predetermined force threshold that may be associated with taps, clicks, scrolling and/or selecting items on electronic device 100. As a result electronic device 100 may determine that user 120 is moving their finger toward the plurality of icons 108, 110 to interact with the icons, instead of attempting to, for example, tap a distinct item (e.g., pop-up, notification and so on) of electronic device 100, and electronic device 100 may subsequently reposition the group of icons 108A-10C, 110A-110D on touch display 104.

The predetermined electronic device data may also be used, separate from or in conjunction with the characteristics of touch gesture 124, to select the group of icons 108A-10C, 110A-110D. That is, electronic device 100 may utilize and/or analyze predetermined electronic device data to select and subsequently reposition the selected group of icons 108A-10C, 110A-110D within touch display 104. The predetermined electronic device data may include a variety of data, information, preferences and/or operational rules that aid in selecting icons to be repositioned on touch display 104, as discussed herein. In a non-limiting example, predetermined electronic device data may include an icon associated with an application that includes a notification 126 (see, FIGS. 5 and 6). In another non-limiting example, predetermined electronic device data may include a predetermined or programmed icon (e.g., favorited icon(s)). In a further non-limiting example, the predetermined electronic device data may include an anticipated icon that may be based on an anticipated use of the anticipated icon, or a learned or programmed use of the anticipated icon. Each of these non-limiting examples will be discussed in detail below. Predetermined electronic device data may be stored on electronic device 100 and/or external storage device(s) in communication with electronic device 100, as discussed herein.

It is understood that the group of icons 108A-108C, 110A-110D may be selected using detected characteristics of touch gesture 124, predetermined electronic device data, or both. In a non-limiting example, all applicable characteristics of touch gesture 124 and/or predetermined electronic device data may be used and/or analyzed for electronic device 100 to select a group of icons 108A-108C, 110A-110D. In another non-limiting example, only a single, applicable characteristic of touch gesture 124 and/or predetermined electronic device data may be used and/or analyzed for electronic device 100 to select a group of icons 108A-108C, 110A-110D. Furthermore, and number of characteristics and/or predetermined electronic device data may be analyzed in order to select a group of icons 108A-108C, 110A-110D.

In the non-limiting example shown in FIG. 4, the selected group of icons 108A-108C, 110A-110D may be based on characteristic of touch gesture 124 and/or predetermined electronic device data. For example, the direction of the path of movement ($P_{MOVE}$) for user 120 performing touch gesture 124 may be toward the system icons 108A-108C and the visible group of application icons 110A-110D. Additionally, or alternatively, system icons 108A-108C and/or the visible group of application icons 110A-110D may be predetermined icons (e.g., predetermined electronic device data) that were selected by system preferences of electronic device 100. In a non-limiting example where both characteristic of touch gesture 124 and predetermined electronic device data used to select icons and there appears to be a conflict between selected icons (e.g., two may icons to be visible on touch display 104), one of the characteristic of touch gesture 124 or predetermined electronic device data may dictate which icons of the plurality of icons 108, 110 are selected for the group of icons 108A-108C, 110A-110D. Additionally, where there is a shortage of selected icons based on, for example, the characteristics of touch gesture 124, a selected icon based on the predetermined electronic device data may be included and/or fill the gap within the selected group of icons 108A-108C, 110A-110D.

As shown in FIG. 4, once the group of icons 108A-108C, 110A-110D is selected, the selected group of icons 108A-108C, 110A-110D may be repositioned on touch display 104. Specifically, electronic device 100 may reposition and/or relocate the selected group of icons 108A-108C, 110A-110D from a first position, adjacent button 106 of electronic device 100 (see, FIG. 3) to a second position, adjacent user 120 (e.g., user's finger). As shown in the non-limiting example in FIG. 4, the selected group of icons 108A-108C, 110A-110D may only be repositioned and/or relocated on touch display 104, but may not be rearranged. Additionally, none of the non-visible groups 112A, 112B of application icons 110E-110L may be repositioned and/or made visible on touch display 104. As discussed above, the non-visible groups 112A, 112B of application icons 110E-110L may not be repositioned and/or made visible on touch display 104 as a result of the characteristic of touch gesture 124 and/or predetermined electronic device data used to select the group of icons 108A-108C, 110A-110D to be repositioned on touch display 104.

Figure 5:
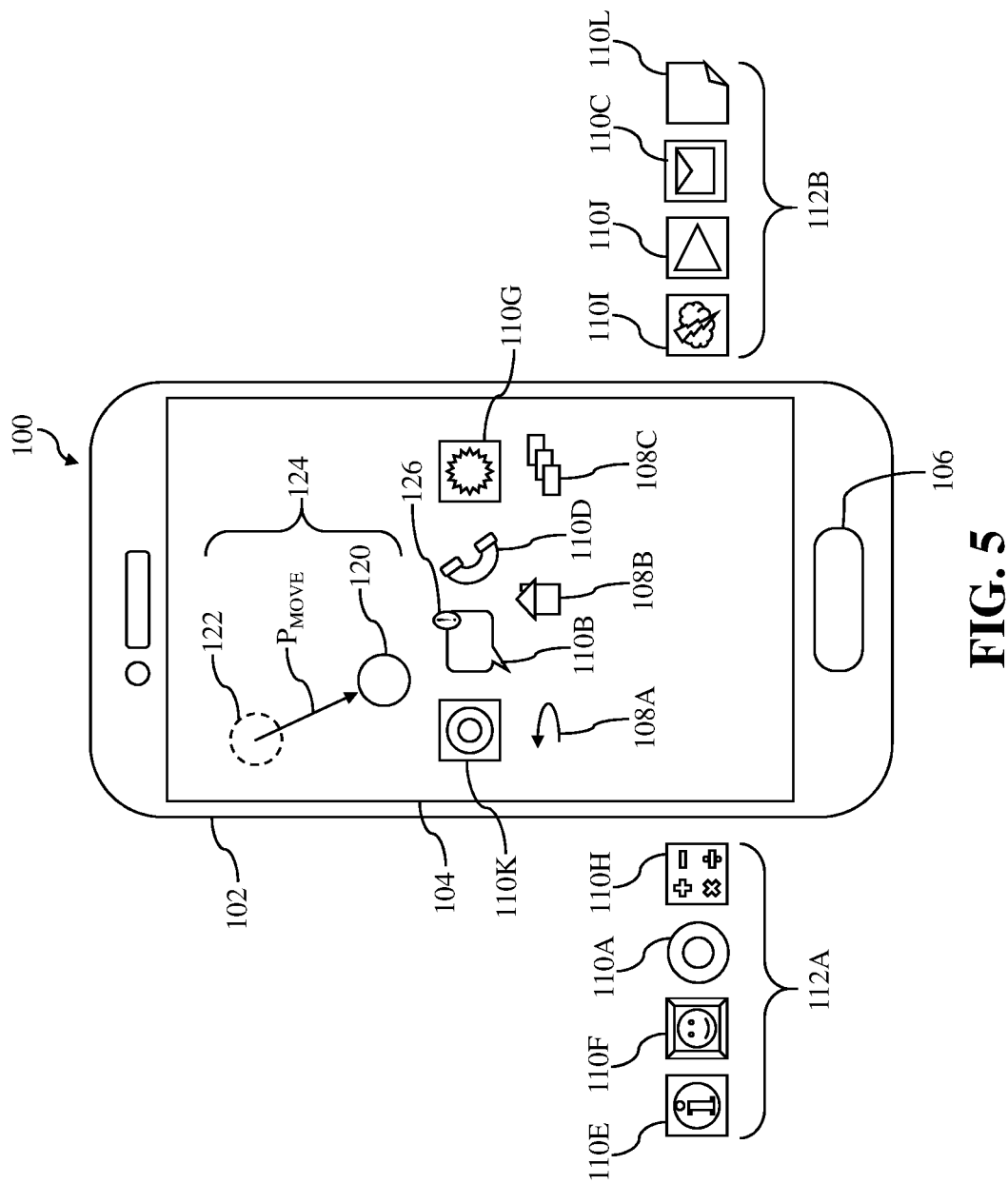
FIG. 5 depicts an illustrative front view of the electronic device and repositioning icons on the electronic device based on predetermined electronic device data, according to embodiments.

FIG. 5 depicts another non-limiting example of electronic device 100 repositioning icons 108, 110 on touch display 104. As shown in FIG. 5, the selected group of icons 108A-108C, 110B, 110D, 110G, 110K may be distinct from the selected group of icons 108A-108C, 110A-110D depicted in FIGS. 3 and 4. Specifically, the selected group of application icons 110B, 110D, 110G, 110K shown in FIG. 5 may differ from the selected group of application icons 110A-110D shown in FIG. 4. For example, application icons 110G, 110K, previously included within the non-visible groups 112A, 112B of the plurality of application icon 110 may be repositioned, relocated and/or visibly depicted on touch display 104. Additionally, previously visible application icons 110A, 110C may be relocated and/or removed from visibility on touch display 104, and/or may be included within non-visible groups 112A, 112B of application icons 110. In the non-limiting example, the selected group of application icons 110B, 110D, 110G, 110K may also be rearranged and/or reordered (see, FIG. 3). Specifically, application icons 110B, 110D may be positioned directly adjacent each other, and/or may not be separated by another application icon.

As discussed herein, the selecting and subsequent repositioning and/or rearranging of the selected group of icons 108A-108C, 110B, 110D, 110G, 110K may be based on characteristics of touch gesture 124 and/or predetermined electronic device data. Specifically, the selected group of application icons 110B, 110D, 110G, 110K may be based on predetermined and/or predefined icons user 120 prefers and/or pre-programs on electronic device 100. That is, user 120 may select predetermined icons (e.g., application icons 110B, 110D, 110G, 110K) that may be repositioned and/or made visible on touch display 104 when user performs touch gesture 124.

In another non-limiting example, the selected group of application icons 110B, 110D, 110G, 110K may be anticipated icons. Specifically, at least one of the application icons 110 of the selected group of application icons 110B, 110D, 110G, 110K may be considered an anticipated icon based on anticipated use information obtained by the user, electronic device 100 and/or applications included within electronic device 100. As shown in FIG. 5, application icon 110K of the selected group of application icons 110B, 110D, 110G, 110K may be associated with a camera application. Anticipated application icon 110K may be included in and/or selected for the selected group of application icons 110B, 110D, 110G, 110K as a result of user 120 taking a visit, trip and/or vacation to a destination that would typically result in pictures being taken. Electronic device 100 may determine user 120 is at the destination based on calendar inputs in a calendar application, exact destination based on GPS applications, status posts and/or "check-ins" on social media applications and/or similar methods and/or processes. As a result, application icon 110K may be identified as an anticipated icon because of the anticipated use and/or likelihood that user 120 will use, select and/or interact with application icon 110K.

In a further non-limiting example, at least one of the application icons 110 of the selected group of application icons 110B, 110D, 110G, 110K may be considered an anticipated icon based on learned information obtained by the user, electronic device 100 and/or applications included within electronic device 100. As shown in FIG. 5, application icon 110G of the selected group of application icons 110B, 110D, 110G, 110K may be associated with an internet-browser application. Anticipated application icon 110G may be included in and/or selected for the selected group of application icons 110B, 110D, 110G, 110K as a result of a learned interaction with application icon 110G by user 120. For example, user 120 may interact with application icon 110G every morning (e.g., between 8:00 AM and 9:00 AM) to check news headlines using the internet-browser application. As such, electronic device 100 may learn and/or anticipate that user 120 will continue to interact with anticipated application icon 110G every morning. As a result, application icon 110G may be identified as an anticipated icon because of the learned use or interactions by user 120.

In another non-limiting example, application icon 110B may be included in the selected group of applications icons 110B, 110D, 110G, 110K based on a pending-notification 126. That is, when selecting application icons 110 to form selected group of application icons 110B, 110D, 110G, 110K that may be repositioned on touch display 104, icons associated with applications that include pending-notifications 126 (e.g., application icon 110B) may be selected. Pending-notification 126 displayed on application icon 110B may indicate a need for immediate attention and/or interaction with the application associated with application icon 110B. For example, application icon 110B may be associated with a messaging application for electronic device 100. Pending-notification 126 on application icon 110B may indicate that there is an unread, unviewed and/or non-responded to message in the messaging application associated with application icon 110B. As a result of application icon 110B being associated with an application that includes pending-notification 126, electronic device 100 may select application 110B to be included within the selected group of application icons 110B, 110D, 110G, 110K so a user 120 may be more easily be made aware (e.g., visually depicted on touch display 104) of pending-notification 126 in the application associated with application icon 110B.

Figure 6:
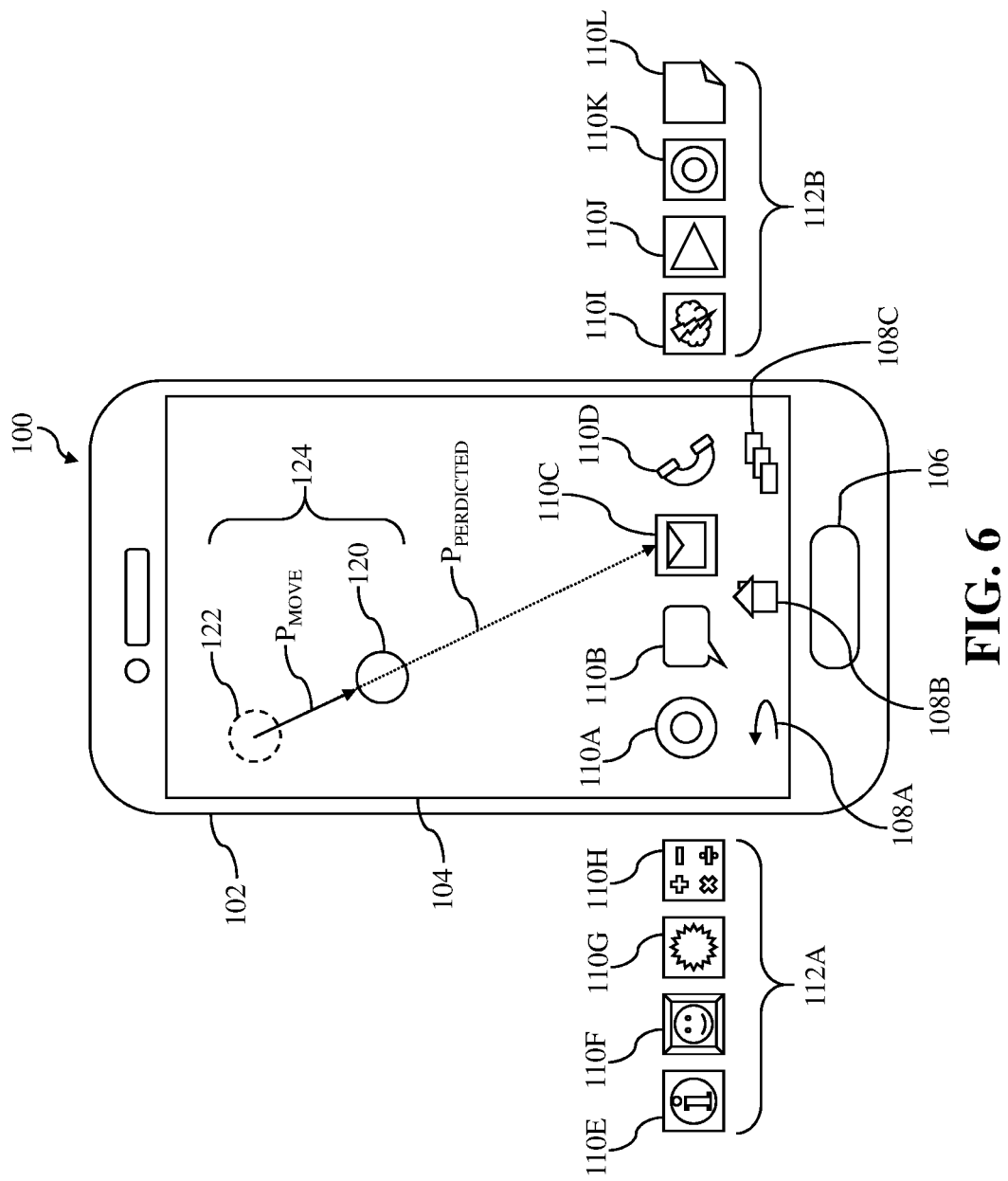
FIG. 6 depicts an illustrative front view of the electronic device of FIG. 2, the user interacting with the electronic device and an anticipated path of movement for the user, according to embodiments.
Figure 7:
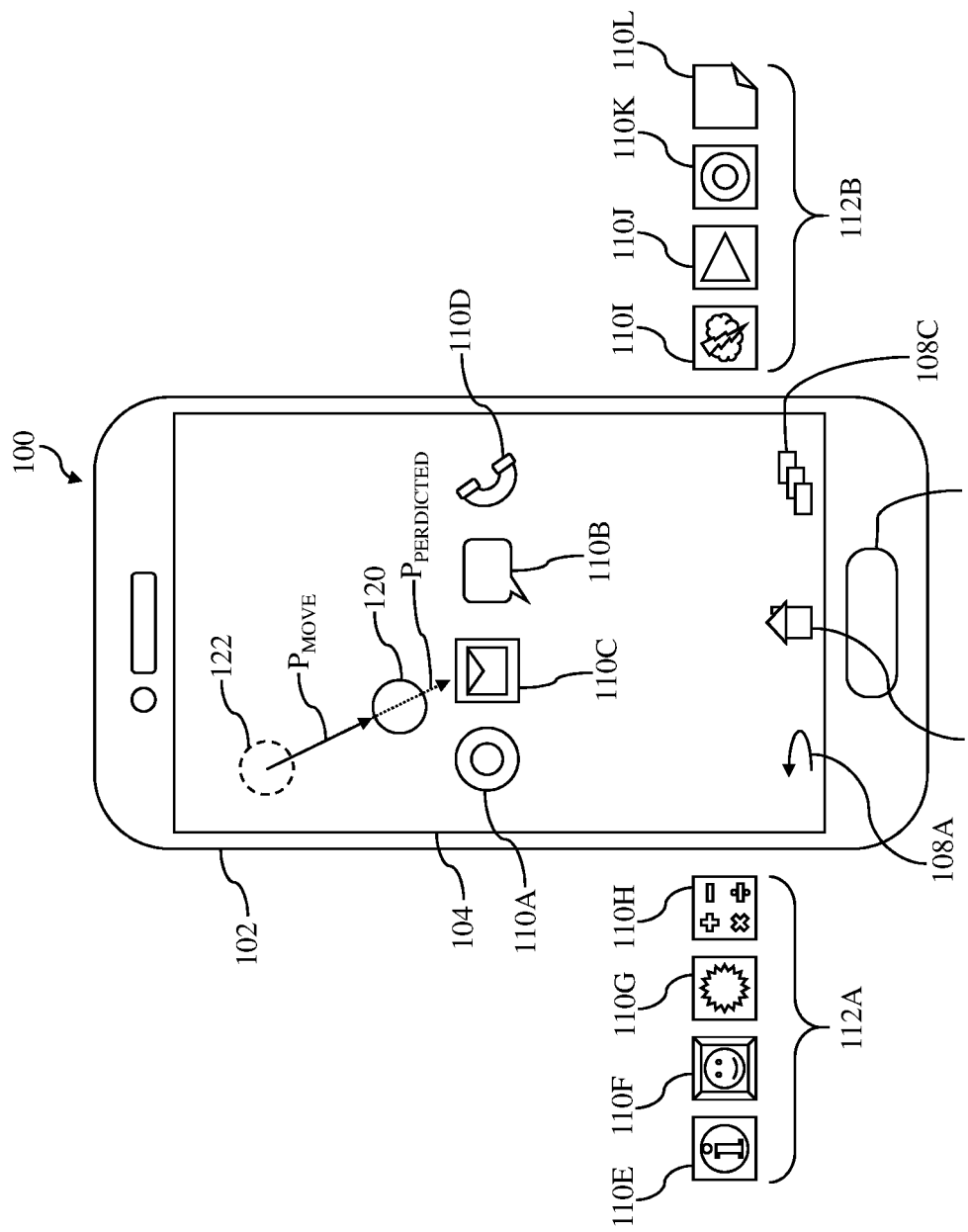
FIG. 7 depicts an illustrative front view of the electronic device and repositioning icons on the electronic device based on the anticipated path of movement for the user of FIG. 6, according to embodiments.
Figure 8:
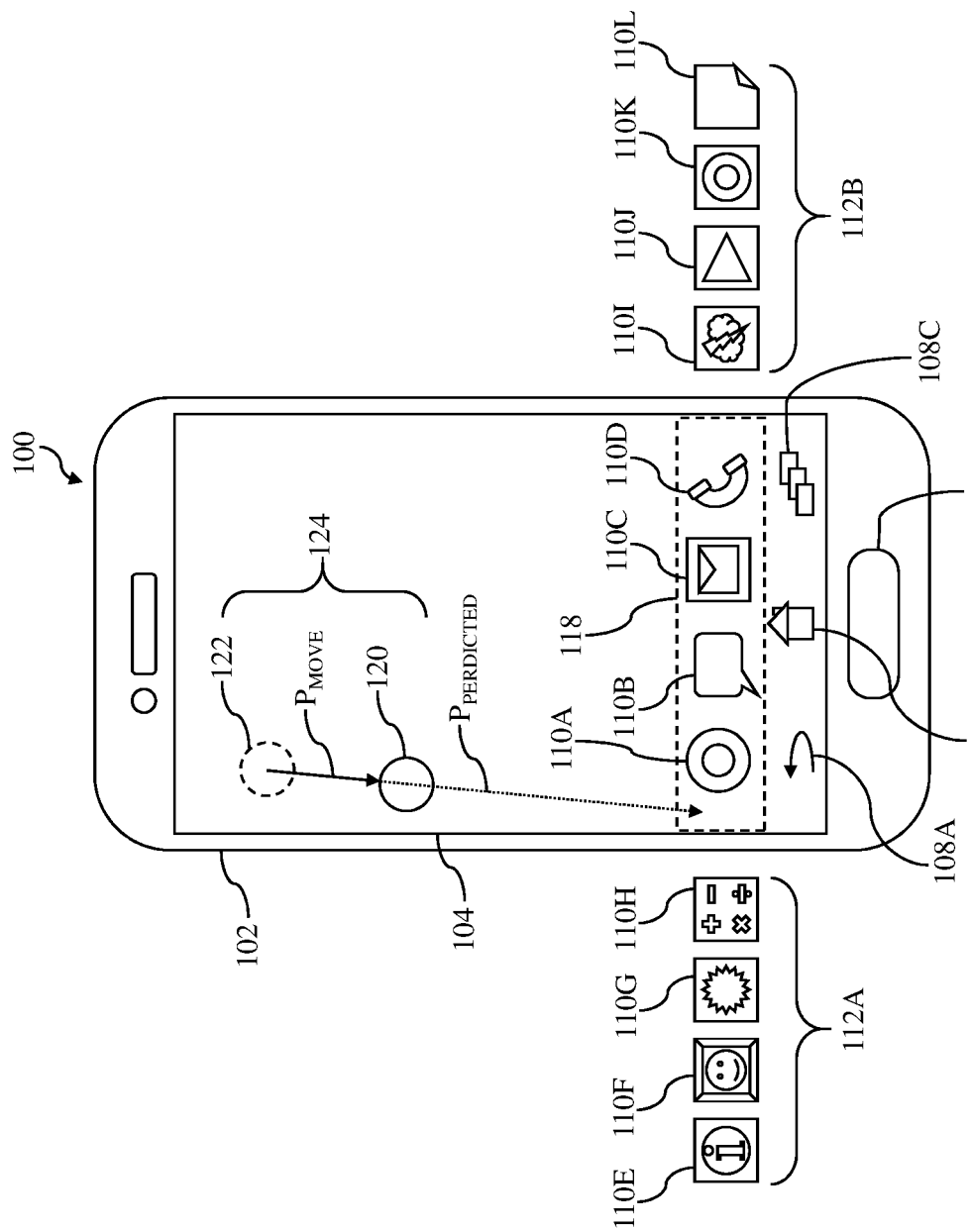
FIG. 8 depicts an illustrative front view of the electronic device of FIG. 2, the user interacting with the electronic device and an anticipated path of movement for the user, according to additional embodiments.

FIGS. 6-9 depict additional non-limiting examples of repositioning icons 108, 110 on touch display 104 based on characteristics of touch gesture 124. As shown in FIGS. 6-9, and as similarly discussed herein with respect to FIGS. 2-4, a direction or path of movement ($P_{MOVE}$) for user 120 performing touch gesture 124 (e.g., movement characteristic) may be detected and/or sensed, and utilized for selecting and repositioning the selected group of icons 110A-110D (see, FIG. 7) or 110E-110H (see, FIG. 9) on touch display 104. Distinct from FIGS. 2-4, a predicted touch path ($P_{PREDICTED}$) for user 120 may be also be determined by electronic device 100 based on movement characteristics of touch gesture 124. Specifically, the predicted touch path ($P_{PREDICTED}$) for touch gesture 124 performed by user 120 may be determined, identified, calculated and/or predicted using the direction and/or path of movement ($P_{MOVE}$) of touch gesture 124 performed on touch display 104 by user 120. As shown in FIGS. 6 and 8, the predicted touch path ($P_{PREDICTED}$) for touch gesture 124 may be a predicted and/or calculated trajectory of user's 120 path of movement ($P_{MOVE}$) along and/or on touch display 104 when performing touch gesture 124. As discussed in detail below with respect to the non-limiting example shown in FIGS. 6 and 7, and the distinct, non-limiting example shown in FIGS. 8 and 9, the predicted touch path ($P_{PREDICTED}$) for touch gesture 124 may be utilized to identify at least one icon 108, 110 aligned with and/or positioned directly adjacent the predicted touch path ($P_{PREDICTED}$) that may be included in and/or selected for the selected group of icons to be repositioned on touch display 104.

Turning to FIG. 6, the predicted touch path ($P_{PREDICTED}$) for touch gesture 124 performed by user 120 may be directed toward and/or may be aligned with application icons 110A-110D. Specifically, the trajectory of predicted touch path ($P_{PREDICTED}$) for touch gesture 124 may be directly aligned with application icon 110C displayed on touch display 104. As discussed herein, electronic device 100 may predict and/or calculate the predicted touch path ($P_{PREDICTED}$) for touch gesture 124 based on movement characteristics of touch gesture 124 (e.g., direction of movement, path of movement ($P_{MOVE}$), length of touch gesture 124, duration of contact and so on) performed by user 120.

Additionally, based on the predicted touch path ($P_{PREDICTED}$) for touch gesture 124, electronic device 100 may also identify at least one icon that may be aligned with and/or positioned directly adjacent the predicted touch path ($P_{PREDICTED}$). The identified icon(s) aligned with and/or positioned directly adjacent the predicted touch path ($P_{PREDICTED}$) may be selected and/or included in the selected group of icons 110A-110D (see, FIG. 7) that may be repositioned on touch display 104. That is, electronic device 100 may select the identified icon(s) to be included within the selected group of icons by determining that user 120 is attempting to interact with the identified icon(s) based on the identified icon(s) being aligned with and/or positioned directly adjacent the predicted touch path ($P_{PREDICTED}$) for touch gesture 124. As discussed above and depicted in the non-limiting shown in FIG. 6, application icon 110C may be aligned with the predicted touch path ($P_{PREDICTED}$) for touch gesture 124. As such, and with reference to FIG. 7, electronic device 100 may select application icon 110C to be included within the selected group of icons 110A-110D that may be repositioned on touch display 104. As shown in the non-limiting example of FIG. 7, repositioning application icon 110C may also include repositioning, rearranging and/ or moving application icon 110C to be directly adjacent touch gesture 124 and substantially aligned with the predicted touch path ($P_{PREDICTED}$) for touch gesture 124. With comparison to FIG. 6, by selecting the identified application (e.g., application icon 110C) and subsequently repositioning, rearranging and/or moving application icon 110C to be directly adjacent touch gesture 124 and substantially aligned with the predicted touch path ($P_{PREDICTED}$) for touch gesture 124, user 120 may more easily and/or more quickly interact with application icon 110C.

In the non-limiting example shown in FIG. 7, system icons 108A-108C may not be repositioned on touch display 104 based on touch gesture 124. Specifically, and with comparison to FIGS. 4 and 5, system icons 108A-108C may remain fixed on touch display 104, adjacent button 106 of electronic device 100. System icons 108A-108C may remain fixed and/or may not move on touch display 104 when selected group of icons 110A-110D may be repositioned on touch display 104. That is, and as discussed herein, system icons 108A-108C may remain fixed and/or may not move on touch display 104 as a result of the movement characteristics (e.g., direction of movement of touch gesture 124, a predetermined touch sequence (see, FIG. 10) and so on) and/or predetermined electronic device data (e.g., predetermined system preferences, programmed user preferences and so on), that may determine the icons, 108, 110 that may be selected and/or included in the selected group of icons 110A-110D.

Figure 9:
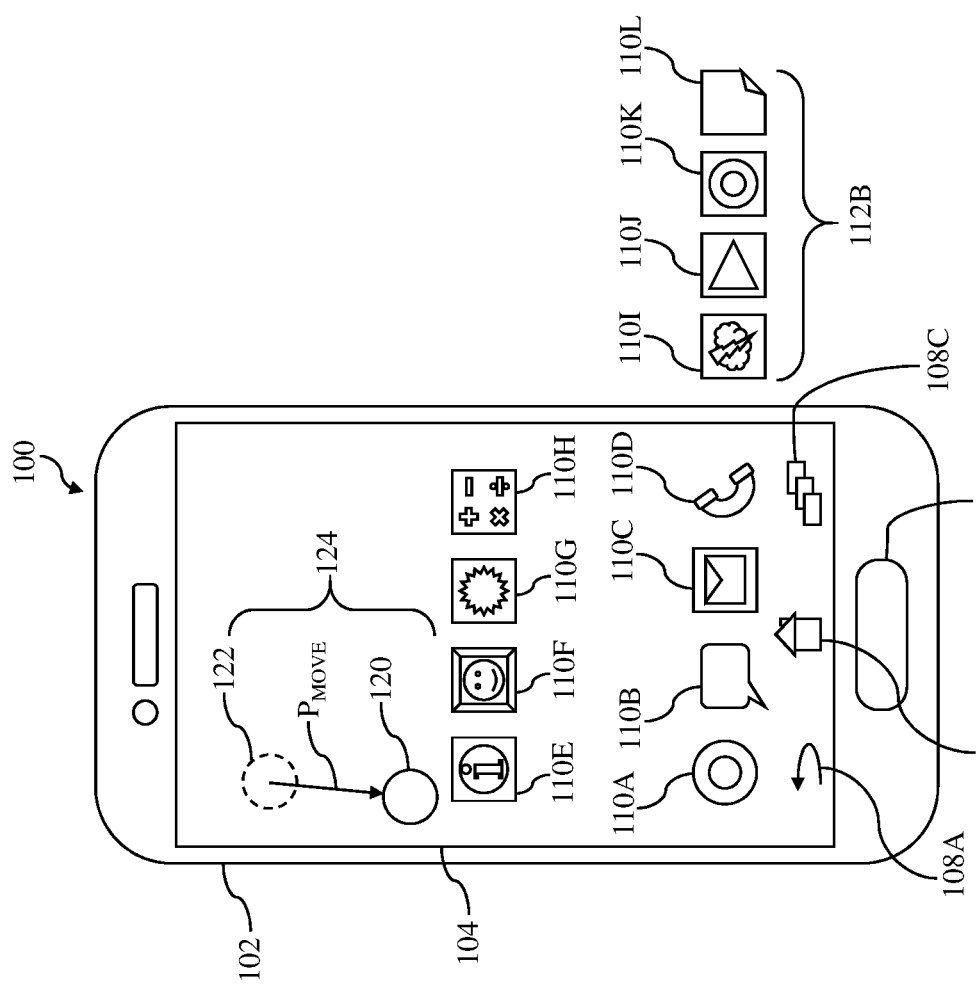
FIG. 9 depicts an illustrative front view of the electronic device and repositioning icons on the electronic device based on the anticipated path of movement for the user of FIG. 8, according to additional embodiments.

Turning to FIGS. 8 and 9, another non-limiting example of repositioning the selected group of icons 110E-110H based on the predicted touch path ($P_{PREDICTED}$) for touch gesture 124 is shown. Distinct from the predicted touch path ($P_{PREDICTED}$) shown in FIG. 6, the predicted touch path ($P_{PREDICTED}$) for touch gesture 124 depicted in FIG. 8 is not aligned with, positioned directly adjacent to and/or directed toward any of the visible system icons 108A-108C or application icons 110A-110D visible on touch display 104. Rather, the predicted touch path ($P_{PREDICTED}$) for touch gesture 124 shown in FIG. 8 is aligned with swipe area 118. As discussed herein with respect to FIG. 1, user 120 may perform a swipe gesture and/or may move their finger in a direction ($D_{SWIPE}$) (see, FIG. 1) within swipe area to make the non-visible groups 112A, 112B of application icons 110E-110L visible on touch display 104. As a result of the predicted touch path ($P_{PREDICTED}$) for touch gesture 124 being aligned with swipe area 118, electronic device 100 may determine user 120 performing touch gesture 124 is attempting to access, make visible and/or interact with at least one application icon 110E-110H included in first non-visible group 112A. In view of this determination based on the predicted touch path ($P_{PREDICTED}$) for touch gesture 124, electronic device 100 may select and/or include application icons 110E-110H included in first non-visible group 112A in selected group of application icons 110E-110F repositioned on touch display 104, as shown in FIG. 9. Selected group of application icons 110E-110F may be visually depicted on touch display 104, and may be repositioned and/or moved adjacent user 120 performing touch gesture 124 so user 120 may quickly and/or more easily interact with application icons 110E-110H without having to perform a swipe gesture within swipe area 118.

In the non-limiting example shown in FIG. 9, application icons 110A-110D and system icons 108A-108C may not be repositioned on touch display 104 based on touch gesture 124. Specifically, and with comparison to FIGS. 4-7, application icons 110A-110D and system icons 108A-108C may remain fixed on touch display 104, adjacent button 106 of electronic device 100. As similarly discussed herein with respect to FIG. 7, application icons 110A-110D and system icons 108A-108C may remain fixed and/or may not move on touch display 104 when selected group of icons 110E-110H may be repositioned on touch display 104. That is, and as discussed herein, application icons 110A-110D and system icons 108A-108C may remain fixed and/or may not move on touch display 104 as a result of the movement characteristics (e.g., direction of movement of touch gesture 124, a predetermined touch sequence (see, FIG. 10) and so on) and/or predetermined electronic device data (e.g., predetermined system preferences, programmed user preferences and so on), that may determine the icons, 108, 110 that may be selected and/or included in the selected group of icons 110E-110H.

Figure 10:
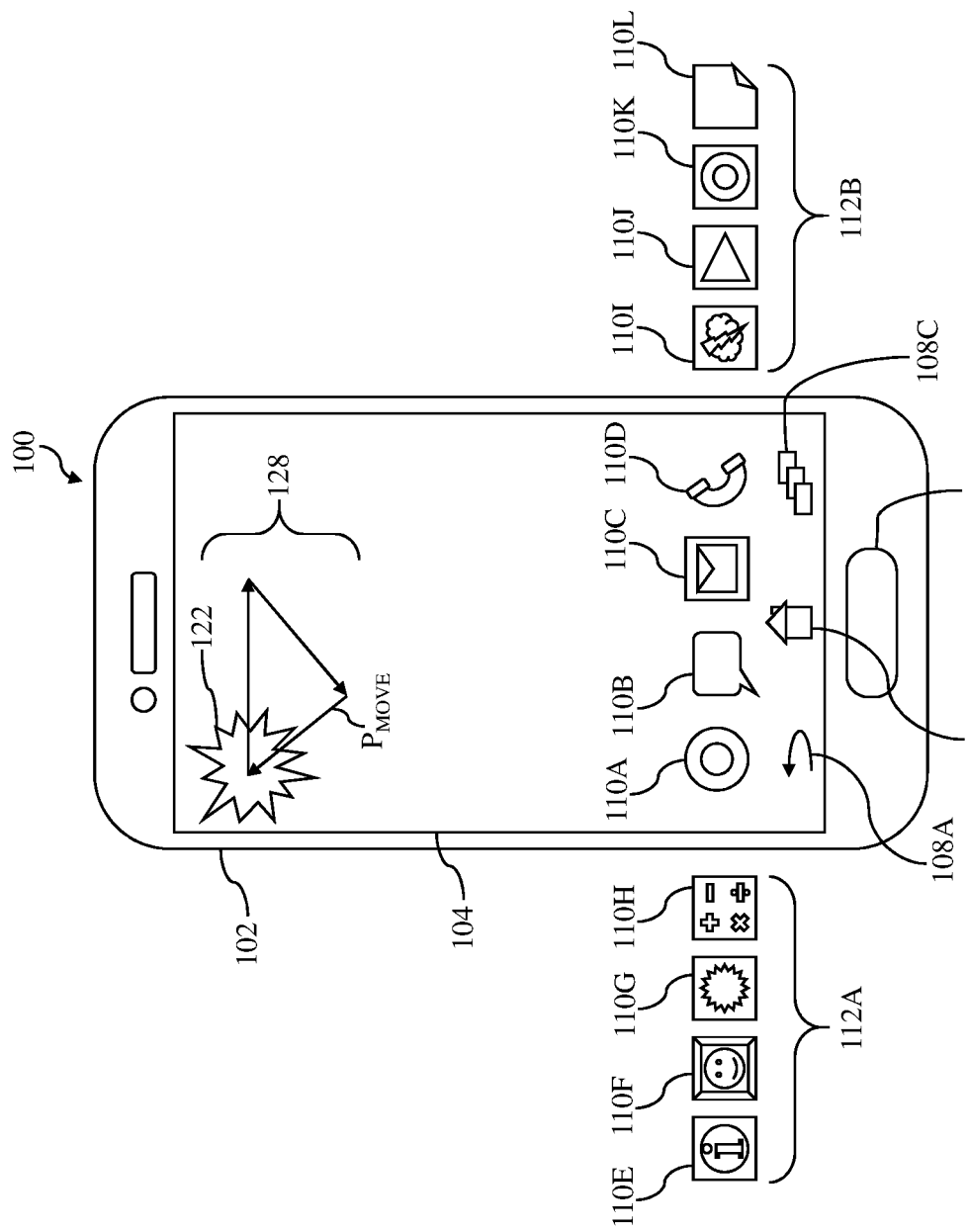
FIG. 10 depicts an illustrative front view of the electronic device of FIG. 2, the user interacting with the electronic device and a predetermined touch sequence performed by the user, according to embodiments.

Turning to FIG. 10, an additional non-limiting example for repositioning icons 108, 110 on touch display 104 of electronic device 100 is depicted. Specifically, FIG. 10 shows a non-limiting example of a predetermined touch sequence 128 that may be performed by user 120 (not shown) on touch display 104. In the non-limiting example, user 120 may perform an initial touch 122 of touch display 104 and may perform predetermined touch sequence 128 by moving their finger along a path of movement ($P_{MOVE}$) shown in FIG. 10. Electronic device 100 may identify and/or detect predetermined touch sequence 128 performed by user 120 on touch display 104, and may form and/or select icons 108, 110 to be included in the selected group of icons to be repositioned on touch display 104. Predetermined touch sequence 128 may be one of the movement characteristics that may aid in the selecting of icons 108, 110 for the selected group of icons, as discussed herein. In a non-limiting example, performing predetermined touch sequence 128 on touch display 104 as shown in FIG. 10 may configure electronic device 100 to select applications icons for the selected group of icons that may have been previously selected or programmed by user 120 (e.g., favorited icons). In other non-limiting examples, performing predetermined touch sequence 128 on touch display 104 as shown in FIG. 10 may configure electronic device 100 to select applications icons based on other movement characteristics, force characteristics and/or predetermined electronic device data, as discussed herein with respect to FIGS. 2-9.

Figure 11:
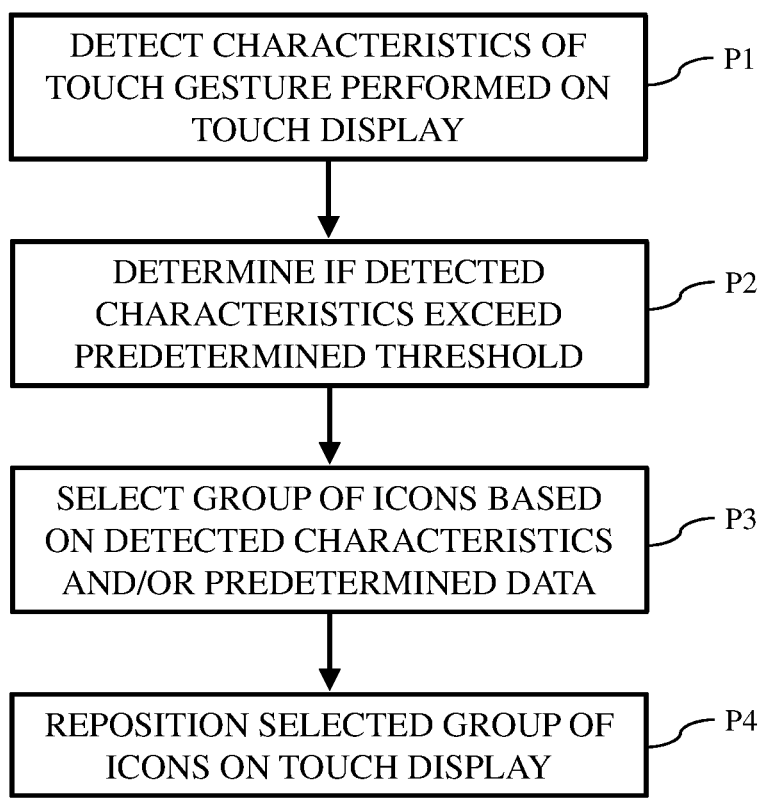
FIG. 11 depicts a flow chart of an example process for repositioning icons on a touch display of an electronic device based on characteristics of touch gestures performed on the touch display, according to embodiments.

FIG. 11 shows a flow diagram illustrating non-limiting example processes of repositioning icons 108, 110 on touch display 104 of electronic device 100. These processes can be performed, e.g., by at least one computing device including included within electronic device 100 (see, FIG. 12), as described herein. In other cases, these processes can be performed according to a computer-implemented method of repositioning icons 108, 110 on touch display 104 of electronic device 100. In still other embodiments, these processes can be performed by executing computer program code on the computing device(s) included in electronic device 100, causing the computing device(s) to reposition icons 108, 110 on touch display 104 of electronic device 100.

In process P1, characteristics of a touch gesture performed on a touch display of an electronic device are detected. Detecting the characteristics of the touch gesture performed on the touch display may include sensing a movement characteristic of the touch gesture and/or sensing a force or force characteristic of the touch gesture. The sensed force may be applied to the touch display of the electronic device. Sensing the movement characteristic of the touch gesture may also include identifying a direction of movement for the touch gesture, identifying a length of the touch gesture performed on the touch display, identifying a duration of contact with the touch display, identifying a discontinuity in contact with the touch display, and/or identifying a predetermined touch sequence performed on the touch display.

In process P2, the detected characteristics of the touch gesture are compared to predetermined thresholds to determine if the detected characteristics of the touch gesture exceed the predetermined thresholds. The predetermined thresholds may correspond to and/or correlate to the detected characteristics. Specifically, the predetermined thresholds may include predetermined movement thresholds (e.g., direction of movement threshold, length of touch threshold, and so on), as well as, predetermined force thresholds (e.g., force magnitude thresholds).

In process P3, a group of icons may be selected. The group of icons may be selected in response to determining the detected characteristics of the touch gesture exceed the predetermined thresholds. Additionally, the group of icons may be selected based on the detected characteristics of the touch gesture performed on the touch display and/or predetermined electronic device data. Selecting the group of icons based on the predetermined electronic device data may also include identifying icons that are associated with applications that include a pending-notification, identifying predetermined icon(s) and/or identifying anticipated icon(s). The anticipated icons may be based on an anticipated use or interaction with the anticipated icon by the user and/or a learned use or interaction with the anticipated icon by the user. Selecting the group of icons may also include predicting a touch path for the touch gesture based on the identified direction of movement for the touch gesture, and identifying at least one icon aligned with or positioned directly adjacent the predicted touch path of the touch gesture.

In process P4, the selected group of icons are repositioned on the touch display of the electronic device. Repositioning the selected group of icons on the touch display may include relocating the selected group of icons from a first position on the touch display to a second position on the touch display. Additionally, repositioning the selected group of icons on the touch display may include rearranging an order of the selected group of icons at the second position on the touch display. Furthermore, in response to predicting a touch path for the touch gesture and identifying an icon aligned and/or positioned adjacent the predicted touch path in process P3, the repositioning in process P4 may also include moving the at least one identified icon directly adjacent the touch gesture/user and/or aligning with the identified icon with the predicted path of the touch gesture.

Figure 12:
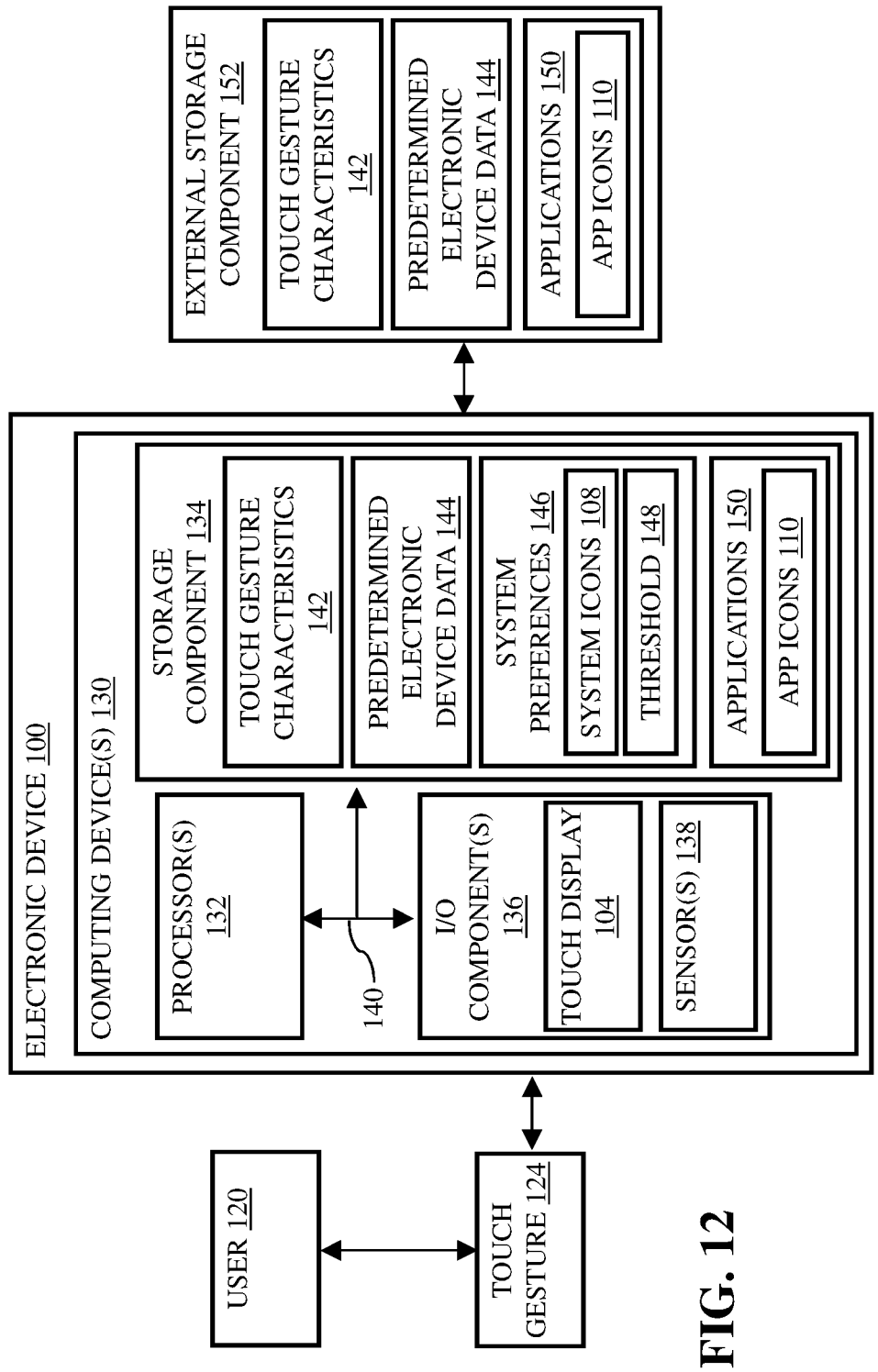
FIG. 12 depicts a schematic view of an electronic device configured to reposition icons on a touch display of the electronic device based on characteristics of touch gestures performed on the touch display, according to embodiments.

FIG. 12 depicts a schematic view of electronic device 100, and the various components included within electronic device 100. In the non-limiting example shown in FIG. 12, electronic device 100 may include at least one computing device 130 that may be configured to reposition icons 108, 110 on touch display 104 of electronic device 100. It is understood that similarly numbered and/or named components may function in a substantially similar fashion. Redundant explanation of these components has been omitted for clarity.

It is understood that computing device(s) 130 may be implemented as a computer program product stored on a computer readable storage medium. The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Java, Python, Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

Electronic device 100 may include any type of computing device(s) 130 and for example includes at least one processor 132, storage component 134, input/output (I/O) component(s) 136 (including touch display 104 and sensors 138 in communication with touch display 104), and a communications pathway 140. In general, processor(s) 132 execute program code which is at least partially fixed in storage component 134. While executing program code, processor(s) 132 can process data, which can result in reading and/or writing transformed data from/to storage component 134 and/or I/O component(s) 136 for further processing. The pathway 140 provides a communications link between each of the components in computing device(s) 130. I/O component 136 can comprise one or more human I/O devices, which enable a user to interact with computing device(s) 130. Computing devices 130 may also be implemented in a distributed manner such that different components reside in different physical locations.

Storage component 134 may also include modules, data and/or electronic information relating to various other aspects of electronic device 100. Specifically, operational modules and/or data relating to touch gesture characteristics 142, predetermined electronic device data 144, and system preferences 146 including system icons 108 and associated applications (not shown), as well as predetermined thresholds 148. Additionally, storage component 134 may also include operational modules and/or data relating to applications 150 for electronic device 100, including the associated application icons 110.

Electronic device 100, and specifically computing device 130 of electronic device 100, may also be in communication with an external storage component 152. External storage component 152 may be configured to store various modules, data and/or electronic information relating to various other aspects of electronic device 100, similar to storage component 134 of computing device(s) 130. Additionally, external storage component 152 may be configured to share (e.g., send and receive) data and/or electronic information with computing device(s) 130 of electronic device 100. In the non-limiting example shown in FIG. 12, external storage component 152 may include operational modules and/or data relating to touch gesture characteristics 142, predetermined electronic device data 144, and applications 150 for electronic device 100, including the associated application icons 110. In a non-limiting example, external storage component may be a cloud-based storage component or system.

Furthermore, it is understood that computing device(s) 130 of electronic device 100 or relevant components thereof (such as an API component, agents, etc.) may also be automatically or semi-automatically deployed into a computer system by sending the components to a central server or a group of central servers. The components are then downloaded into a target computer that will execute the components. The components are then either detached to a directory or loaded into a directory that executes a program that detaches the components into a directory. Another alternative is to send the components directly to a directory on a client computer hard drive. When there are proxy servers, the process will select the proxy server code, determine on which computers to place the proxy servers' code, transmit the proxy server code, and then install the proxy server code on the proxy computer. The components will be transmitted to the proxy server and then it will be stored on the proxy server.

The foregoing description of various aspects of the invention has been presented for purposes of illustration and description. It is not intended to be exhaustive or to limit the invention to the precise form disclosed, and obviously, many modifications and variations are possible. Such modifications and variations that may be apparent to an individual in the art are included within the scope of the invention as defined by the accompanying claims.

What is claimed is:

1. A method comprising:
    detecting characteristics of a touch gesture performed on a touch display of an electronic device, the touch gesture performed on the touch display in a region not occupied by at least one icon displayed on the touch display;
    determining if the detected characteristics of the touch gesture exceed a predetermined threshold;
    in response to determining the detected characteristics exceed the predetermined threshold, selecting a group of icons that are non-visible on the touch display based on the detected characteristics of the touch gesture performed on the touch display, selecting the group of icons including:
        predicting a touch path for the touch gesture based on an identified direction of movement for the touch gesture;
        determining that the touch gesture is aligned with a swipe area in a direction toward at least one icon that is non-visible on the touch display; and
        identifying an area aligned with the predicted touch path, the area associated with the at least one icon that is non-visible on the touch display; and
    repositioning the selected group of icons on the touch display directly adjacent the touch gesture and aligned with the predicted path of the touch gesture, wherein repositioning the selected group of icons includes moving the at least one non-visible icon directly adjacent the touch gesture and aligned on the predicted path of the touch gesture.

2. The method of claim 1, wherein detecting characteristics of the touch gesture performed on the touch display includes:
    sensing a movement characteristic of the touch gesture; and
    sensing a force of the touch gesture, the force applied to the touch display of the electronic device.

3. The method of claim 2, wherein sensing the movement characteristic includes at least one of:
    identifying a length of the touch gesture performed on the touch display,
    identifying a duration of contact with the touch display,
    identifying a discontinuity in contact with the touch display, or
    identifying a predetermined touch sequence performed on the touch display.

4. The method of claim 1, wherein selecting the group of icons is further based on predetermined electronic device data, the selecting of the group of icons including at least one of:
    identifying at least one predetermined icon, or
    identifying at least one anticipated icon based on at least one of:
        an anticipated use of the anticipated icon, or
        a learned use of the anticipated icon.

5. The method of claim 1, wherein repositioning the selected group of icons on the touch display includes:
    relocating the selected group of icons from a first position on the touch display to a second position on the touch display.

6. The method of claim 5, wherein repositioning the selected group of icons on the touch display includes:
    rearranging an order of the selected group of icons at the second position on the touch display.

7. A computer program product stored on a computer readable storage medium, which when executed by a computing system, processes characteristics of a touch gesture performed on a touch display of an electronic device where the touch gesture is performed in a region not occupied by at least one icon displayed on the touch display, the program product comprising:
    program code that determines if the characteristics of the touch gesture exceed a predetermined threshold;
    program code that selects a group of icons that are non-visible on the touch display based the characteristics of the touch gesture performed on the touch display in response to determining the characteristics of the touch gesture exceed the predetermined threshold, the program code that selects the group of icons predicting a touch path for the touch gesture based on an identified direction of movement for the touch gesture, the program code that selects the group of icons determining that the touch gesture is aligned with a swipe area in a direction toward at least one icon that is non-visible on the touch display, wherein the program code further selects the group of icons by identifying an area aligned with the predicted touch path, the area associated with the at least one icon that is non-visible on the touch display; and
    program code that repositions the selected group of icons on the touch display directly adjacent the touch gesture and aligned with the predicted path of the touch gesture.

8. The program product of claim 7, wherein the characteristics of the touch gesture performed on the touch display includes:
    a movement characteristic of the touch gesture; and
    a force of the touch gesture, the force applied to the touch display.

9. The program product of claim 8, wherein the movement characteristic includes at least one of:
    a length of the touch gesture performed on the touch display,
    a duration of contact with the touch display,
    a discontinuity in contact with the touch display, or
    a predetermined touch sequence performed on the touch display.

10. The program product of claim 7, wherein the program code selects the group of icons based on the characteristics of the touch gesture by:
    identifying at least one icon aligned with the predicted touch path for the touch gesture.

11. The program product of claim 10, wherein the program code repositions the selected group of icons on the touch display by:
    moving the at least one identified icon directly adjacent the touch gesture and aligned with the predicted path of the touch gesture.

12. The program product of claim 7, wherein the program code further selects the group of icons based predetermined electronic device data, the predetermined electronic device data including at least one of:
    at least one predetermined icon, or
    at least one anticipated icon based on at least one of:
        an anticipated interaction of the anticipated icon, or
        a learned interaction of the anticipatedicon.

13. The program product of claim 7, wherein the program code repositions the selected group of icons on the touch display by:
    relocating the selected group of icons from a first position on the touch display to a second position on the touch display.

14. The program product of claim 13, wherein the program code repositions the selected group of icons on the touch display by:
rearranging an order of the selected group of icons at the second position on the touch display.

15. A computerized method that processes characteristics of a touch gesture performed on a touch display of an electronic device, the method comprising:
detecting characteristics of a touch gesture performed on a touch display of an electronic device, the touch gesture performed on the touch display in a region not occupied by at least one icon displayed on the touch display;
determining if the detected characteristics of the touch gesture exceed a predetermined threshold;
in response to determining the detected characteristics exceed the predetermined threshold, selecting a group of icons that are non-visible on the touch display based on the detected characteristics of the touch gesture performed on the touch display, the selecting of the group of icons including:
predicting a touch path for the touch gesture based on an identified direction of movement for the touch gesture;
determining that the touch gesture is aligned with a swipe area in a direction toward at least one icon that is non-visible on the touch display; and
identifying an area aligned with the predicted touch path, the area associated with the at least one icon that is non-visible on the touch display; and
repositioning the selected group of icons on the touch display directly adjacent the touch gesture and aligned with the predicted path of the touch gesture, wherein repositioning the selected group of icons includes moving the at least one identified icon directly adjacent the touch gesture and aligned on the predicted path of the touch gesture.

16. The computerized method of claim 15, wherein detecting characteristics of the touch gesture performed on the touch display includes:
sensing a movement characteristic of the touch gesture; and
sensing a force of the touch gesture, the force applied to the touch display of the electronic device.

17. The computerized method of claim 15, wherein repositioning the selected group of icons on the touch display includes:
relocating the selected group of icons from a first position on the touch display to a second position on the touch display.

18. The computerized method of claim 17, wherein repositioning the selected group of icons on the touch display includes:
rearranging an order of the selected group of icons at the second position on the touch display.

19. The method of claim 1, wherein selecting the group of icons is further based on predetermined electronic device data, the selecting of the group of icons including identifying an icon associated with an application that includes a pending-notification.

20. The program product of claim 7, wherein the program code further selects the group of icons based predetermined electronic device data, the predetermined electronic device data including an icon associated with an application that includes a pending-notification.

* * * * *